(12) United States Patent
Triantafillou et al.

(10) Patent No.: US 9,064,116 B2
(45) Date of Patent: Jun. 23, 2015

(54) TECHNIQUES FOR SECURITY MANAGEMENT PROVISIONING AT A DATA STORAGE DEVICE

(75) Inventors: Nicholas D. Triantafillou, Portland, OR (US); Paritosh Saxena, Beaverton, OR (US); Robert W. Strong, Folsom, CA (US); Richard J. Heiler, Folsom, CA (US); Eliezer Tamir, Bait Shemesh (IL); Simoni Ben-Michael, Givat Zeev (IL); Brad W. Stewart, Elverta, CA (US); Akshay R. Kadam, Bangalore (IN); Men Long, Beaverton, OR (US); James T. Doyle, Phoenix, AZ (US); Hormuzd M. Khosravi, Portland, OR (US); Lokpraveen B. Mosur, Gilbert, AZ (US); Edward J. Pullin, Orefiled, PA (US); Paul S. Schmitz, North Plains, OR (US); Carol L. Barrett, Beaverton, OR (US); Paul J. Thadikaran, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 12/941,915

(22) Filed: Nov. 8, 2010

(65) Prior Publication Data

US 2012/0117348 A1 May 10, 2012

(51) Int. Cl.
*G06F 12/00* (2006.01)
*G06F 21/56* (2013.01)
(52) U.S. Cl.
CPC .................................. *G06F 21/566* (2013.01)
(58) Field of Classification Search
CPC .................................................. G06F 21/566

USPC ......................................................... 711/163
See application file for complete search history.

(56) References Cited

U.S. PATENT DOCUMENTS

| 7,526,785 | B1 | 4/2009 | Pearson et al. |
| 7,657,941 | B1 * | 2/2010 | Zaitsev ........................... 726/24 |
| 7,854,006 | B1 * | 12/2010 | Andruss et al. ................. 726/24 |
| 8,079,084 | B1 * | 12/2011 | Huang et al. .................... 726/24 |
| 2003/0055994 | A1 * | 3/2003 | Herrmann et al. ............ 709/229 |
| 2004/0083405 | A1 * | 4/2004 | Chang et al. .................... 714/24 |
| 2004/0175976 | A1 * | 9/2004 | Park .............................. 439/176 |
| 2005/0005131 | A1 * | 1/2005 | Yoshida et al. ............... 713/183 |
| 2005/0050378 | A1 * | 3/2005 | Liang ................................ 714/4 |
| 2006/0294355 | A1 | 12/2006 | Zimmer et al. |
| 2008/0282350 | A1 * | 11/2008 | Khilnani et al. ................ 726/24 |

(Continued)

OTHER PUBLICATIONS

"PCT, International Search Report and Written Opinon of the International Searching Authority for International Application No. PCT/US2011/058533", (Mar. 28, 2012), Whole Document.
"PCT, International Preliminary Report on Patentability (Chapter I of the International Cooperation Treaty) for International Application No. PCT/US2011/058533", (May 23, 2013), Whole Document.

(Continued)

*Primary Examiner* — Larry Mackall
(74) *Attorney, Agent, or Firm* — Blakely, Sokoloff, Taylor & Zafman LLP

(57) ABSTRACT

Techniques for a data storage device to locally implement security management functionality. In an embodiment, a security management process of the data storage device is to determine whether an access to non-volatile media of the data storage device is authorized. In certain embodiments, the data storage device is to restrict access to a secure region of the non-volatile storage media, the secure region to store information used and/or generated by a security management process of the data storage device.

16 Claims, 8 Drawing Sheets

(56) References Cited

U.S. PATENT DOCUMENTS

| | | |
|---|---|---|
| 2009/0113151 A1* | 4/2009 | Teranishi et al. ............ 711/162 |
| 2010/0083381 A1* | 4/2010 | Khosravi et al. ............... 726/24 |
| 2010/0162370 A1 | 6/2010 | Altay et al. |
| 2010/0174887 A1 | 7/2010 | Pawlowski |
| 2010/0269156 A1 | 10/2010 | Hohlfeld et al. |

OTHER PUBLICATIONS

"Office Action for Korean Patent Application No. 100138638", (May 8, 2014), Whole Document.

"Second Office Action for Taiwan Patent Application No. 100138638", (Sep. 23, 2014), Whole Document.

* cited by examiner

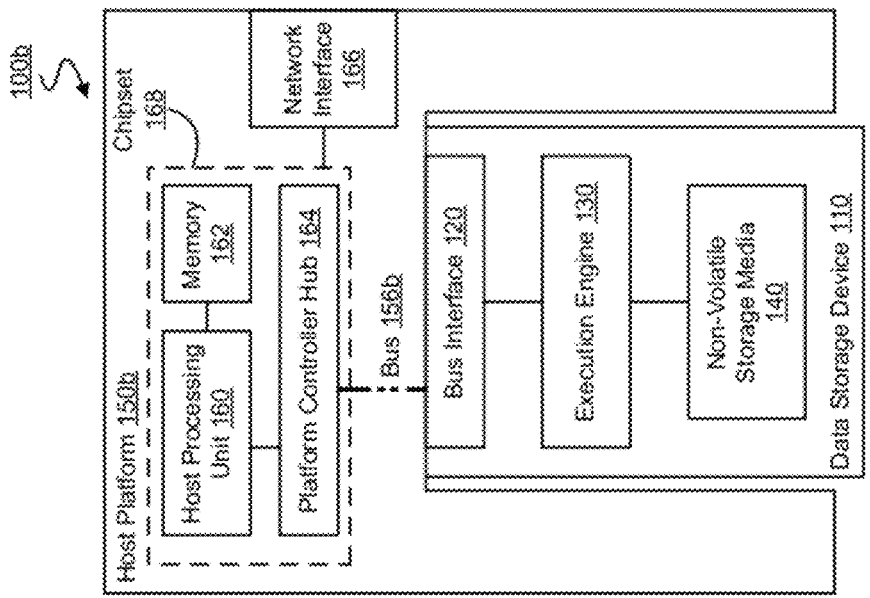
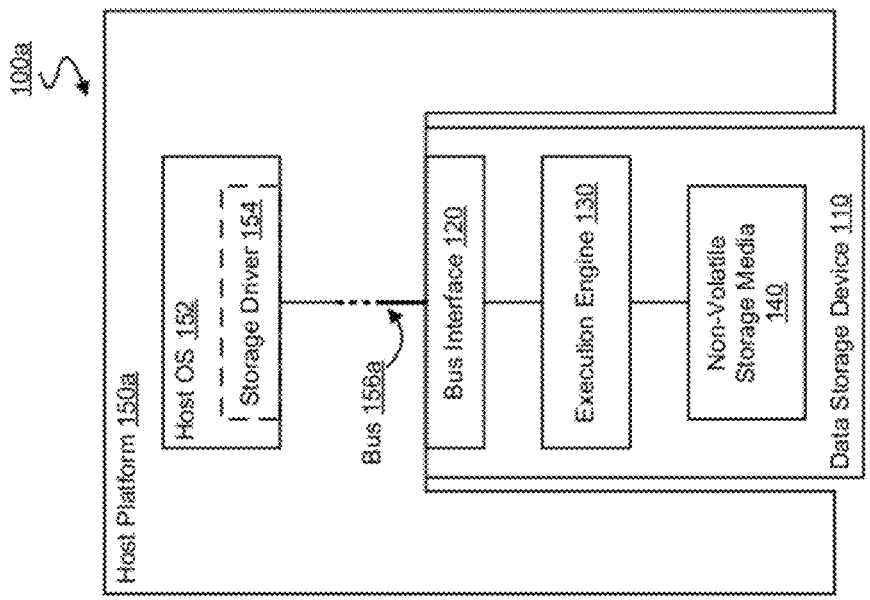

US 9,064,116 B2

TECHNIQUES FOR SECURITY MANAGEMENT PROVISIONING AT A DATA STORAGE DEVICE

BACKGROUND

1. Technical Field

Various embodiments relate generally to computer security. More particularly, embodiments provide for a data storage device to locally implement one or more of its own local security management processes.

2. Background Art

Computers and computer networks must deal with the rapid growth in malware variants and a corresponding decrease in the number of computer platforms (clients, servers, etc) that are infected by the same malware variant. Moreover, malware creators are building security threats that are increasingly stealthy, e.g. including capabilities that turn off anti-malware software (AVS) and/or feed false disk-data to AVS applications. The increasing variety and capabilities of malware has reduced the level of trust in host system execution environments for maintaining up-to-date AVS solutions.

Under current techniques, security management processes to evaluate security state of a data storage device (DSD)—such as malware detection and/or malware recovery—are performed in a host platform to which the DSD is connected. Accordingly, compromising the security state of such a host platform results in a compromising of security management for the storage device coupled thereto.

Moreover, the scalability of mechanisms for updating such security management capabilities in chipsets of various host platforms may be limited. The volume of platforms that can implement a particular security improvement may depend on the install base of host chipsets which already have required and/or compatible hardware for that security solution. For example, the introduction of a virtualization instruction set for a particular type of central processing unit (CPU) may be limited by the need to first establish a root of trust, which may (for example) require that a chipset which includes that CPU also includes a Trusted Platform Module (TPM) like component. Security solutions which require the presence of such additional enabling ingredients in a host chipset may be limited in their scalability.

The limitations of implementing security management in a host chipset, and the limitations to updating such security management implementations, leaves existing computer platforms susceptible to attacks from increasingly dangerous malware.

BRIEF DESCRIPTION OF THE DRAWINGS

The various embodiments of the present invention are illustrated by way of example, and not by way of limitation, in the figures of the accompanying drawings and in which:

FIGS. 1A and 1B are each a block diagram illustrating select elements of a respective computer system for provisioning security management according to an embodiment.

DETAILED DESCRIPTION

Figure 2:
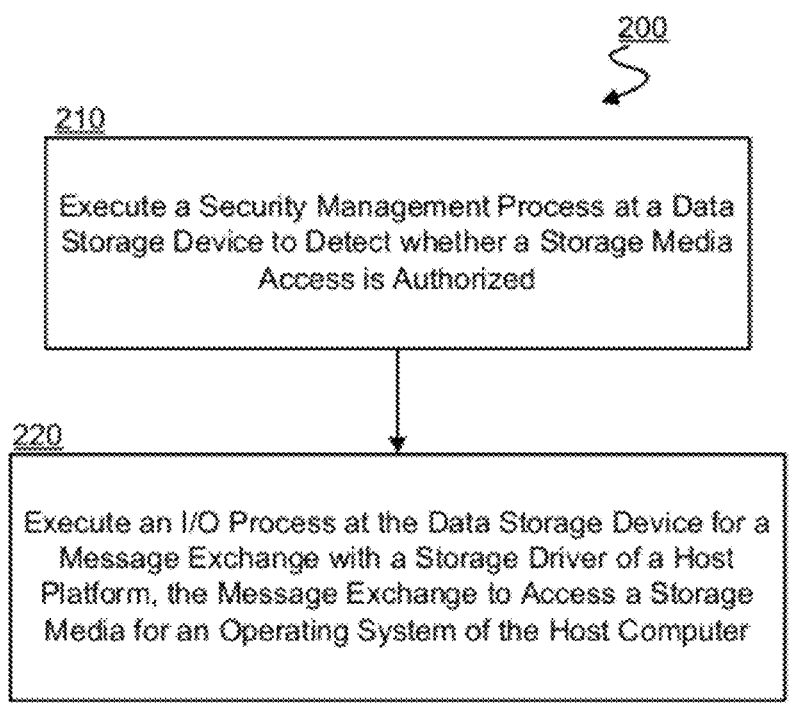
FIG. 2 is a flow diagram illustrating select elements of a method for implementing security management according to an embodiment.

Various embodiments relate to robust hardware-based security solutions for implementing local security management at a storage device such as a solid state drive (SSD), network attached storage (NAS), server attached storage (SAS), dual drive, hybrid drive or a hard disk drive (HDD). Such solutions significantly improve the reliability of security management features including, but not limited to, malware scan performance, authentication, encryption, data recovery and the like. Memory controller or other data processing hardware such as that found in current data storage devices may be augmented with additional logic, processing cycles, etc. to locally determine, for example, whether an access to local non-volatile storage media is authorized.

Local detecting at the storage device for authorized (or unauthorized) accesses may include, for example, scanning data (e.g. files and/or applications) that resides in local non-volatile storage media of the storage device. Alternatively or in addition, such detecting may include scanning data that is being transported into or out of the non-volatile storage media. In various embodiments, detecting for authorized (or unauthorized) accesses is self-contained—e.g. entirely implemented (and in certain embodiments, entirely initiated) within the data storage device (DSD), where performance of the detecting does not include processing or data exchanges by some host platform for the DSD.

In various embodiments, additional hardware and/or software may also be provided locally on the DSD to provide features which support and/or extend the local determining of whether accesses are authorized (or unauthorized). Such logic may be included in the DSD, for example, by integration of one or more additional processing cores, fixed function accelerators, ASICs, FPGAs and/or similar hardware to implement security management features discussed herein.

By way of illustration and not limitation, hardware and/or software logic may be provided for the DSD to create a "landing zone" for an independent software vendor (ISV) to securely store files and/or applications and/or authenticating tokens in one or more secure storage regions, e.g. where access to said regions by the host platform is at least partially restricted. Alternatively or in addition, hardware and/or software logic may be provided for the DSD to locally generate trusted differential information—e.g. describing which files and/or applications have been modified by some agent.

In various embodiments, memory controller functionality resident on a DSD may include, or have access to, one or more local accelerators—dedicated hardware to aid data processing by efficiently performing particular types of functions. Such accelerators may include, for example, a hashing engine, a cryptographic engine for encrypting/decrypting communications and/or a pattern matching engine to aid in data scans and/or data filtering.

In various embodiments, security management functionality implemented at the DSD may include the local management of backup operations, e.g. to store backup versions of one or more files stored on the storage device. Such security management may further include management of auto-recovery operations based on such backup operations, e.g. to restore previous data state if it is determined that a change to data state is due to a virus or other malware.

In various embodiments, security management functionality implemented at the DSD may include locally performing authentication of an agent external to the DSD. For example, the DSD may store a root of trust in a secure storage subsystem thereof, the root of trust to be used for locally evaluating security credentials of an external agent. Such authentication may be in addition to and/or independent of any authentication which may be performed at the host platform for the DSD. For example, some or even all security management operations performed at the DSD may be transparent to a host OS of the host platform for the DSD. Indeed, such security management operations may even be transparent to a manageability engine of the host platform—e.g. management engine operations of some platform controller hub, dedicated management processor or management processing mode of the host platform to which the DSD is coupled.

FIG. 1A illustrates select elements of a computer system 100a for providing security management according to an embodiment. Computer system 100a may include any one of a variety of personal computers (PCs), desktops, laptops, notebooks, servers, handheld devices, etc. capable of implementing message exchanges with a DSD as described herein.

In an embodiment, computer system 100a includes a DSD 110 which includes a bus interface 120 to couple the DSD 110 to a bus 156a of a host platform 150a. DSD 110 may serve as storage for data which is to be made available to and/or through host platform 150a. For example, DSD 110 may include a non-volatile storage media 140, e.g. a hard disk platter accessible by any of a variety of mechanisms of a hard disk drive (HDD). Alternatively or in addition, non-volatile storage media 140 may include a solid state media such as a NAND-based flash memory.

It is noted that, from one point of view, DSD 110 may be considered an extension of host platform 150a when coupled to bus 156a. For example, in various embodiments, DSD 110 may receive a power supply from connection to bus 156a or some other connection of host platform 150a. Alternatively or in addition, host platform 150 may include a platform controller hub (not shown) to control certain operations of DSD 110. However, DSD 110 is to be distinguished from host platform 150a at least insofar as DSD 110 may locally implement its own security management processes which are independent of computing processes of host platform 150a.

In an embodiment, bus interface 120 may physically couple DSD 110 to bus 156a for message exchanges between a host operating system (OS) 152 of host platform 150a and an execution engine 130 of DSD 110. Host OS 152 may be a general purpose OS for host platform 150 or a management OS for some other OS (not show) which is a general purpose OS of host platform 150a.

In an embodiment, host OS 152 recognizes DSD 110 as a storage device which is under host platform 150a, and not, for example, as some independent and/or peer platform which is networked with host platform 150a—e.g. a separate network node with a distinct network address or other such identifier. Operations of host OS 152—e.g. for requests of an application executing on host OS 152—may variously exchange messages via a storage driver 154 of host platform 150a to access non-volatile storage media 140. Bus 156a may include, for example, a Universal Serial Bus (USB) bus, a Serial Advanced Technology Attachment (SATA) bus, a Peripheral Component Interconnect Express (PCI-E) bus, a Small Computer System Interface (SCSI) bus such as a Serial Attached SCSI (SAS) bus, or any similar bus capable of exchanging messages to and/or from storage driver 154 as described herein. In an embodiment, DSD 110 may be hot swappable device which can couple to and operate with host platform 150a without requiring that host OS 152 reboot. In an embodiment, message exchanges via the storage driver 154 of host OS 152 are to be distinguished from network communications of host OS 152—e.g. communications for networking computer system 100a with other nodes of a network.

DSD 110 may include an execution engine 130 coupled to bus interface 120. Execution engine 130 may include any of a variety of combinations of hardware logic—e.g. one or more of a processor core, a state machine, an application-specific integrated circuit (ASIC), a programmable read-only memory (PROM), and the like—and/or software logic to exchange messages via bus interface 120 and to control access to non-volatile storage media 140, e.g. by host OS 152. More particularly, execution engine 130 may execute at least one process, referred to herein as an input/output (I/O) process, to access the non-volatile storage media on behalf of the host OS 152 requesting said access. It is understood that such an I/O process may perform either or both of reads from non-volatile storage media 140 and writes to non-volatile storage media 140.

As discussed herein, execution engine 130 may further execute one or more security management processes, e.g. to evaluate security state of the DSD 110 independent of computing processes of host platform 150a.

FIG. 1B illustrates select elements of a computer system 100b for providing security management according to an embodiment. Computer system 100b may include some or all of the features of computer system 100a, for example. In order to avoid obscuring the features of various embodiments, computer system 100b is described herein as having the same DSD 110. It is understood computer system 100b may be coupled to any of a variety of additional or alternative DSDs described herein, according to various embodiments.

Computer system 100b includes a chipset 168, one of a variety of possible chipsets to implement a host OS (such as host OS 152) for communicating with DSD 110 via a storage driver (such as storage driver 154). In an embodiment, chipset 168 may include a host processing unit 160 to execute such a host OS. By way of illustration and not limitation, host processing unit 160 is coupled to a memory 162 and a platform controller hub 164 of chipset 168. Host platform 150b may include various additional or alternate chipsets and/or chipset architectures, according to various embodiments, including any of a variety of different chipset elements and/or chipset configurations. For example, chipset 168 may alternately include no platform controller hub 164—e.g. where bus 156b directly couples DSD 110 to host processing unit 160.

Host platform 150b may include any of a variety of additional components, such as a network interface 166 coupled to chipset 168, for host platform 150b to communicate information to and/or from DSD 110. By way of illustration and not limitation, network interface 166 may couple host platform 150b to a network (e.g. an Internet, Intranet, etc.) for a remote agent (e.g. server, network administrator, AVS provider, etc) to read data from and/or write data to non-volatile storage media 140 and/or to access via execution engine 130 information describing a security state of DSD 110. Alternatively or in addition, host platform 150b may include any of a variety of combinations of one or more user I/O devices (not shown) such as keyboard, mouse, display, and the like for a user to exchange such data and/or security state information with DSD 110.

In an embodiment, execution of one or more security management operations of DSD 110 is agnostic of the component integrated circuits and/or architecture of chipset 168. Correspondingly, hardware design of chipset 168 may be independent of the particular hardware in execution engine 130 to execute security management operations.

FIG. 2 illustrates select elements of a method 200 for providing security management according to an embodiment. Method 200 may be performed, for example, by a DSD execution engine such as execution engine 130, when the DSD is coupled to a host platform of a computer device, such as host platform 150a. Although described herein in terms of DSD 110 coupled to host platform 150a, it is understood that method 200 may be performed by any of a variety of DSDs described herein, where the DSD is coupled to any of a variety of host platforms also described herein.

In an embodiment, method 200 includes, at 210, executing a security management process to detect whether an access of non-volatile storage media 140 is authorized. The DSD may identify a need to perform the security management process, where the identifying is independent of, or alternatively based on (e.g. in response to), communications with the host platform 150a. However, in an embodiment, the actual operations detecting for an authorized (or unauthorized) access of data storage media 140 may be performed entirely within DSD 110—e.g. without having to rely on operations performed on host platform 150a or on communications exchanged with host platform 150a as part of that detecting.

Detecting whether an access of non-volatile storage media 140 is authorized may include detecting for one or more of previous, currently requested, and currently executing accesses and identifying whether any authorization for such detected access is indicated. By way of illustration and not limitation, in detecting whether an access of the non-volatile storage media 140 is authorized, execution engine 130 may scan non-volatile storage media 140 to detect for previously completed or as-yet uncommitted changes to data in non-volatile storage media 140.

Alternatively or in addition, in detecting whether an access of non-volatile storage media 140 is authorized, the security management process may evaluate a security credential from an agent requesting such access to non-volatile storage media 140. For example, the execution engine 130 may evaluate a security credential of a requesting agent residing on host platform 150a—e.g. an application executing on host OS 152—and/or a remote agent coupled via a network to communicate through host platform 150a to DSD 110. In an embodiment, the security management process may verify an authentication code before committing a change to data in non-volatile storage media 140.

It is understood that one or more security management features described herein may be variously implemented by multiple security management processes executed by execution engine 130 at 210 and/or by one or more sub-processes of a security management process executed by execution engine 130 at 210.

Method 200 may further include, at 220, executing an I/O process for a message exchange with storage driver 154 of host platform 150a. In an embodiment, execution of an I/O process may implement a driver for low-level controls of hardware to access non-volatile storage media 140. It is understood that one or more I/O operations at 210 may be variously implemented by multiple I/O processes executed by execution engine 130 at 210 and/or by one or more sub-processes of an I/O process executed by execution engine 130 at 210.

The message exchange facilitated by the I/O process at 220 may be, for example, to access a portion of non-volatile storage media 140 which is accessible to host OS 152. In an embodiment, some or all I/O operations at 210 may be subject to one or more results of security management operations performed at 210, for example. For example, I/O operations to transfer data to or from DSD 110 may be subject to a determination as to whether such a transfer is authorized.

For the sake of brevity in describing features of various embodiments, features of various DSDs of FIGS. 3A through 3D are described herein in terms of their coupling to and operation with host platform 150a. However, it is understood that such features may be extended to additionally or alternatively apply to connections to, and operation with, various other host platforms, also discussed herein.

Figure 3A:
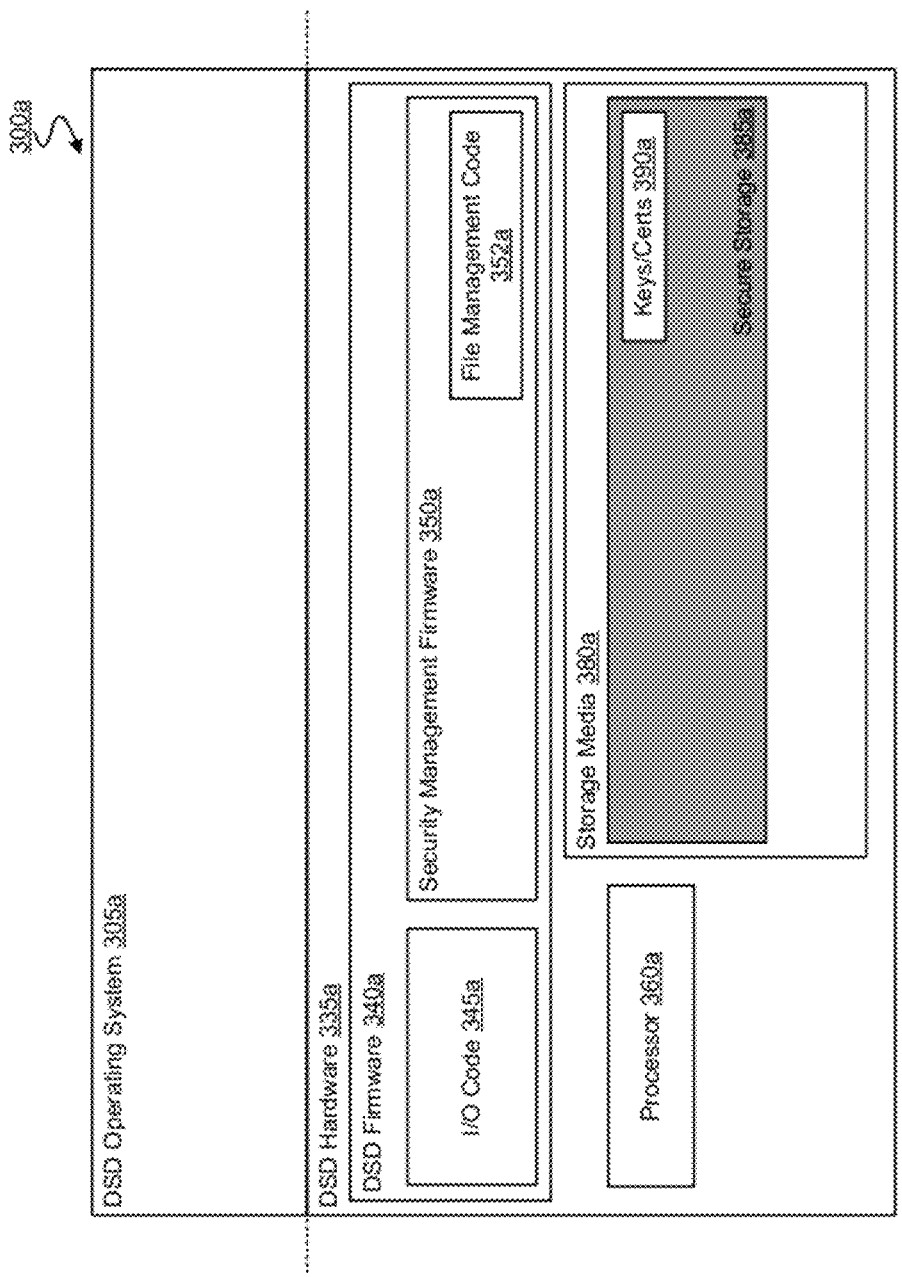
FIGS. 3A through 3D are each a block diagram illustrating select elements of a respective data storage device for providing security management according to an embodiment.

FIG. 3A illustrates select elements of a DSD 300a to provision security management according to an embodiment. DSD 300a may include some or all of the features of DSD 110, for example. In an embodiment, DSD 300a is a pluggable device that may be hot and/or cold plugged to (or un-plugged from) one or more classes of compute capable platforms—e.g. a platform of a netbook, notebook, desktop PC, home entertainment appliance (including a set top box), home gateway or server, in-vehicle infotainment system, office or entertainment equipment, etc. For example, DSD 300a may include bus interface 120 (not shown) for coupling to a host platform such as host platform 150a.

In an embodiment, DSD hardware 335a of DSD 300a may include a processor 360a—e.g. one or more processing cores and/or processing units—to implement execution engine 130. To implement one or more processes of execution engine 130, processor 360a may execute one or more programs—e.g. available in DSD firmware 340a of DSD hardware 335a. By way of illustration and not limitation, execution engine 130 may include an DSD operating system 305a which is implemented by processor 360a executing code in storage media 380a—e.g. in secure storage 385a—and/or in DSD firmware 340a.

In an embodiment, DSD firmware 340a may include I/O code 345a whereby DSD 300a performs I/O processes—e.g. for some or all of the message exchanges at 220. By way of illustration and not limitations, execution of I/O code 345a may result in DSD operating system 305a providing control signals to write data to and/or read data from storage media 380a of DSD hardware 335a.

Alternatively or in addition, DSD firmware 340a may include security management firmware 350a in support of a security management process, e.g. at 210, to be performed by DSD 300a. In an embodiment, security management firmware 350a includes file management code 352a to provision secure storage 385a—one or more regions of storage medium 380a which are accessible to DSD operating system 305a for use in implementing security management services.

File management code 352a may at least partially restrict access to secure storage 385a by one or more external agents—e.g. host platform 150a and/or host OS 152. Additionally or alternatively, file management code 352a may provide for one or more security credentials, represented by keys and/or certificates Keys/Certs 390a, to be stored in secure storage 385a—e.g. for use in verifying that a remote agent has a particular type of access to DSD 300a.

In an embodiment, a user may transport DSD 300a independently for variously connecting to different host platforms at different times. Accordingly, DSD 300a may provide a portable device for a user to easily and securely carry their various information, applications, secure secrets (e.g. passwords, personal-ID, authenticating tokens, provisions to access prepaid services), and the like across different platforms.

Figure 3B:
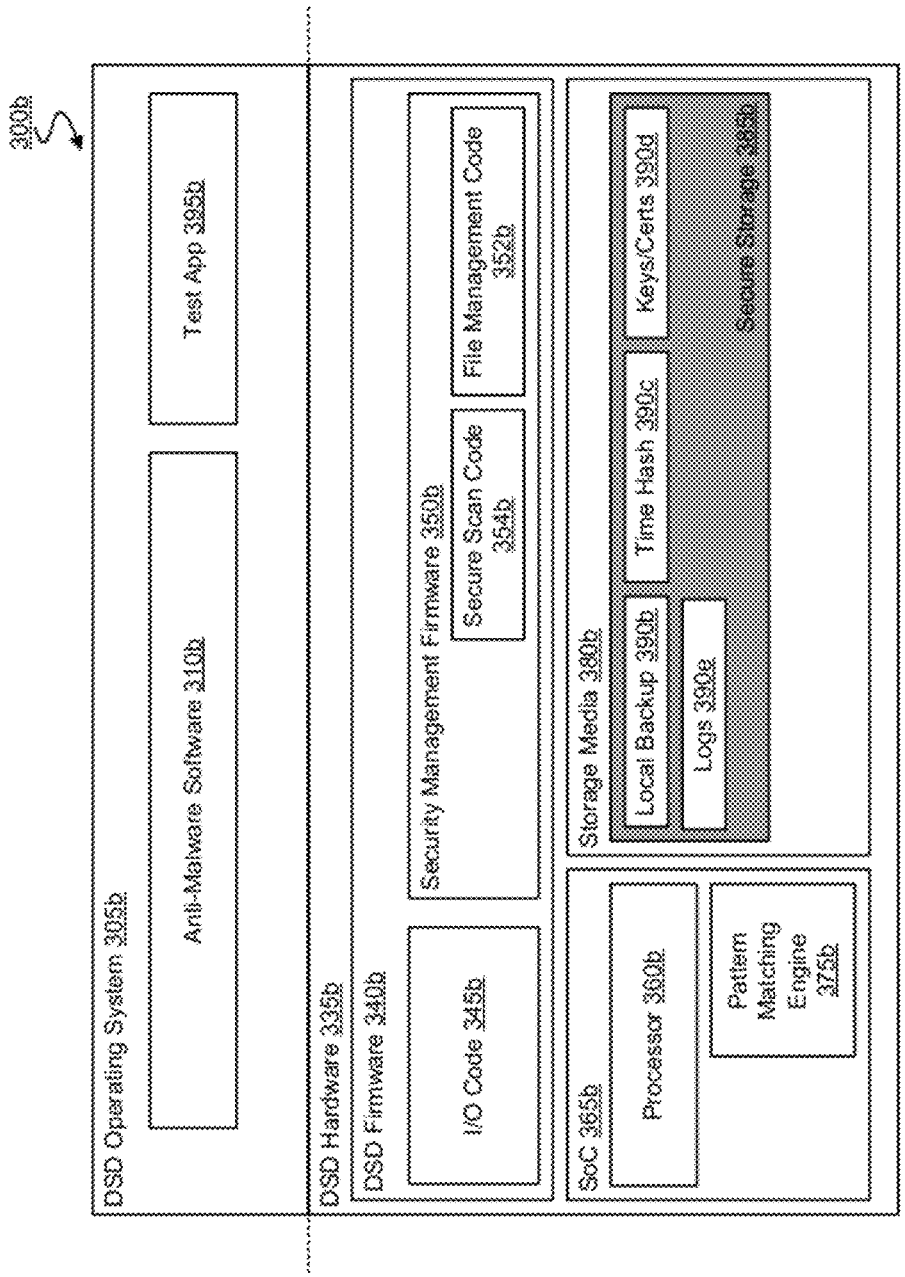

FIG. 3B illustrates select elements of a DSD 300b according to an embodiment. DSD 300b may include some or all of the features of DSD 300a, for example. More particularly, some or all of the features of DSD hardware 335b and/or DSD operating system 305*b* may be found, respectively, in DSD hardware 335*b* and/or DSD operating system 305*b* of DSD 300*b*. For example, a processor 360*b* of DSD hardware 335*b* may execute DSD firmware 340*b* to implement an execution engine for I/O processes to access storage media 380*b* of DSD hardware 335*b*. In an embodiment, I/O processes may be implemented by an executing of I/O code 345*b* in DSD firmware 340*b*. Moreover, security management firmware 350*b* in DSD firmware 340*b* may implement one or more security management processes of the execution engine. In an embodiment, file management code 352*b* of security management firmware 350*b* may control access to secure storage 385*b* of storage media 380*b*.

In an embodiment, DSD operating system 305*b* may include anti-malware software 310*b*—e.g. in response to processor 360*b* executing the secure scan code 354*b* of security management firmware 350*b*. Additionally or alternatively, anti-malware software 310*b* may be implemented by executing code which resides in secure storage 385*b*. Anti-malware software 310*b* may, for example, scan data which is being stored in, transferred to, or transferred from storage medium 380*b*—e.g. the scanning to determine whether an access of DSD 300*b* is authorized.

In an embodiment, execution of secure scan code 354*b* may cause processor 360*b* to additionally or alternatively calculate differential information—e.g. for the purpose of comparing a current state of data in DSD 300*b* to a previous state of data in DSD 300*b*. Such differential information may include, for example, time hash 390*c*, a time-based hash of some amount of data stored in DSD 300*b*. It is understood that execution of secure scan code 354*b* may cause processor 360*b* to calculate any of a variety of additional or alternative types of differential information—e.g. to serve as metadata describing a particular state of data in DSD 300*b* at a particular time.

Alternatively or in addition, such differential information may include a calculation of any difference between information describing a state of data stored in DSD 300*b* at one time and information describing a state of data stored in DSD 300*b* at a different time. The security management processes of processor 360*b* may further determine from such calculated difference that an access of storage media 380*b* (authorized and/or unauthorized) has occurred.

Unlike any differential information that might be generated by host OS 152 (e.g. by host processing unit 160 and/or platform controller hub 164), differential information generated by DSD 300*b* is be trusted because its generation and/or storage in DSD hardware 335*b* is independent of host OS 152 as changes are happening to regions of storage medium 380*b* to which host OS 152 has access.

The differential information may be securely stored in secure storage 385*b*. Differential information and/or other information generated by security management processes of DSD 300*b* may be protected by any of a variety of techniques to restrict access to secure storage 385*b*. Such techniques may include, for example, protocols, data structures, etc. set forth in the Opal Security System Subclass (SSC) specification, published in 2009 by the Trusted Computing Group (TCG™), although various embodiments are not limited in this regard.

An agent who wants to access the differential information may be required to authenticate to a security management process of DSD 300*b*. In an embodiment, such authentication to a security management process may be implemented by embedding a root certificate inside secure storage 385*b*— represented by Keys/Certs 390*d*—and issuing a certificate based on the root certificate to the authorized parties.

In certain embodiments, scanning by the security management processes of DSD operating system 305*b* may be enhanced, for example, by the use of a pattern matching accelerator—e.g. a neural net or other dedicated hardware to perform pattern matching functions. An example of such an accelerator is represented by a pattern match engine 375*b* of system-on-chip 365*b*. Pattern match engine 375*b* may include, for example, any of a variety of regular expression (RegEx) accelerators and/or neural net hardware accelerators such as various ZISC (zero instruction set computer) artificial neural network (ANN) chips.

Although shown in combination with implementation of pattern match engine 375*b*, it is understood anti-malware software 310*b* may, according to various embodiments, operate in a DSD which does not include such enhancements. Moreover, although pattern matching engine 375*b* is shown as residing in the same system-on-chip (SoC) 365*b* as processor 360*b*, it is understood that such hardware may reside on different respective integrated circuit chips, according to various embodiments.

Pattern matching engine 375*b* may be used as a general purpose filter and/or data-mining engine for DSD 300*b*. Equipping DSD 300*b* with such an engine may improve the speed of searches of both unstructured and structured information—e.g. data which is currently stored in, to be sent from and/or to be written to storage media 380*b*. By way of illustration and not limitation, instead of moving large volumes of data to host processing unit 160 to be compared to particular patterns, patterns can be distributed to DSD 300*b*, where pattern matches can be performed with the benefit of reduced latencies associated with data and/or instruction transports. Moreover, parallelization of pattern matching may be availed of in systems having multiple computation-capable storage devices such as DSD 300*b*.

Opportunity also exists to mirror data that is distributed across multiple security-provisioning storage devices that are equipped with pattern matching accelerators, whereby searches/queries/data-mining operations may be conducted efficiently. For example, a plurality of pattern-matching-accelerator equipped storage devices such as DSD 300*b* could be coupled to a common host platform, and/or networked together via multiple host platforms, as data-mining network attached storage (DM-NAS) appliances capable of filtering and finding patterns in data in a time and power efficient manner.

In an embodiment, processor 360*b* may include a type of processor core or cores which will support lower-power-domain (closed-lid or open-lid) operation, when compared to operation of the processor or processors of the host platform. For example, the Intel® Atom processor and/or various lower power consumption processors from ARM® (e.g. in the ARM11™ processor family) may be used to implement one or more security management processes as described herein. The availability of processing power in DSD 300*b* in comparatively lower power modes may expand the available power management options for the host platform to which DSD 300*b* is coupled.

In an embodiment, one or more scanning functions may be performed by DSD 300*b* when the host platform—e.g. host platform 100*a*—is operating in a power state which does not allow for such scanning to be performed at said host platform. For example, such scanning might take place while the host platform operates in the Advanced Configuration and Power Interface (ACPI) S3 Standby mode. In such a standby mode of the host platform, sufficient power from the host platform may nevertheless be available to SoC 365*b* and/or other components of DSD 300*b* for scanning of storage media 380*b* by anti-malware software 310b. Such scanning during low power operations—i.e. during periods of little or no interaction by the end-user—may contribute to AVS scanning operations which are transparent to the end-user.

Sand-boxing is a technique which includes launching an application in a secure compute environment for evaluation before any releasing of the application for execution elsewhere—e.g. by host processing unit 160. In an embodiment, execution of secure scan code 354b may cause processor 360b to additionally or alternatively perform sandboxing and evaluation of a test application 395b executing in DSD operating system 305b. Having processor 360b (e.g. a low power x86 Intel® core or Atom™ core) integrated into DSD 300b allows an ISV to implement and deploy out-of-band and deeply embedded sand-boxing tools whereby an application may be tested to verify whether the application includes malware (e.g. a virus, botnet, etc).

Sandbox evaluation of test app 395b may be supported by a local backup 390b in storage media 380b to store previous versions of data. Local backup 390b may be used to return a modified set of data to some previous state—e.g. if the modifications to such data are merely for testing purposes and/or if the modifications were determined to be due to operations of malware. In various embodiments, local backup 390b may additionally or alternatively be used to provide backup versions for data which is being modified by a real-world (i.e. non test mode) execution of an application.

Execution of secure scan code 354b may cause processor 360b to additionally or alternatively maintain one or more logs—e.g. in secure storage 385b—as represented by log 390e. Log 390e may store information regarding any of a variety of events including, but not limited to, one or more of I/O events, access authorization events, scanning events, malware detection and/or recovery events, and the like. In an embodiment, some or all of the information in log 390e is inaccessible by host OS 152. In another embodiment, log 390e may be accessed by a remote agent (e.g. host OS 152 and/or a remote service communicating with system 100a via a network) which presents a valid certificate.

Execution of secure scan code 354b may cause processor 360b to additionally or alternatively evaluate the integrity of files in storage media 380b. By way of illustration and not limitation, secure scan code 354b may perform error correction code, parity or other integrity evaluations which do not rely on calculations by host OS 152.

Where DSD 300b maintains one or more logs such as log 390e, ISVs, IT departments, and other such agents may treat such a storage device as a malware sensor, wherein real-time information can be compiled by, and accessed from, DSD 300b to assess the nature and level of security threats and/or to assess the impact (return on investment) which particular security actions taken in a network may have.

Figure 3C:
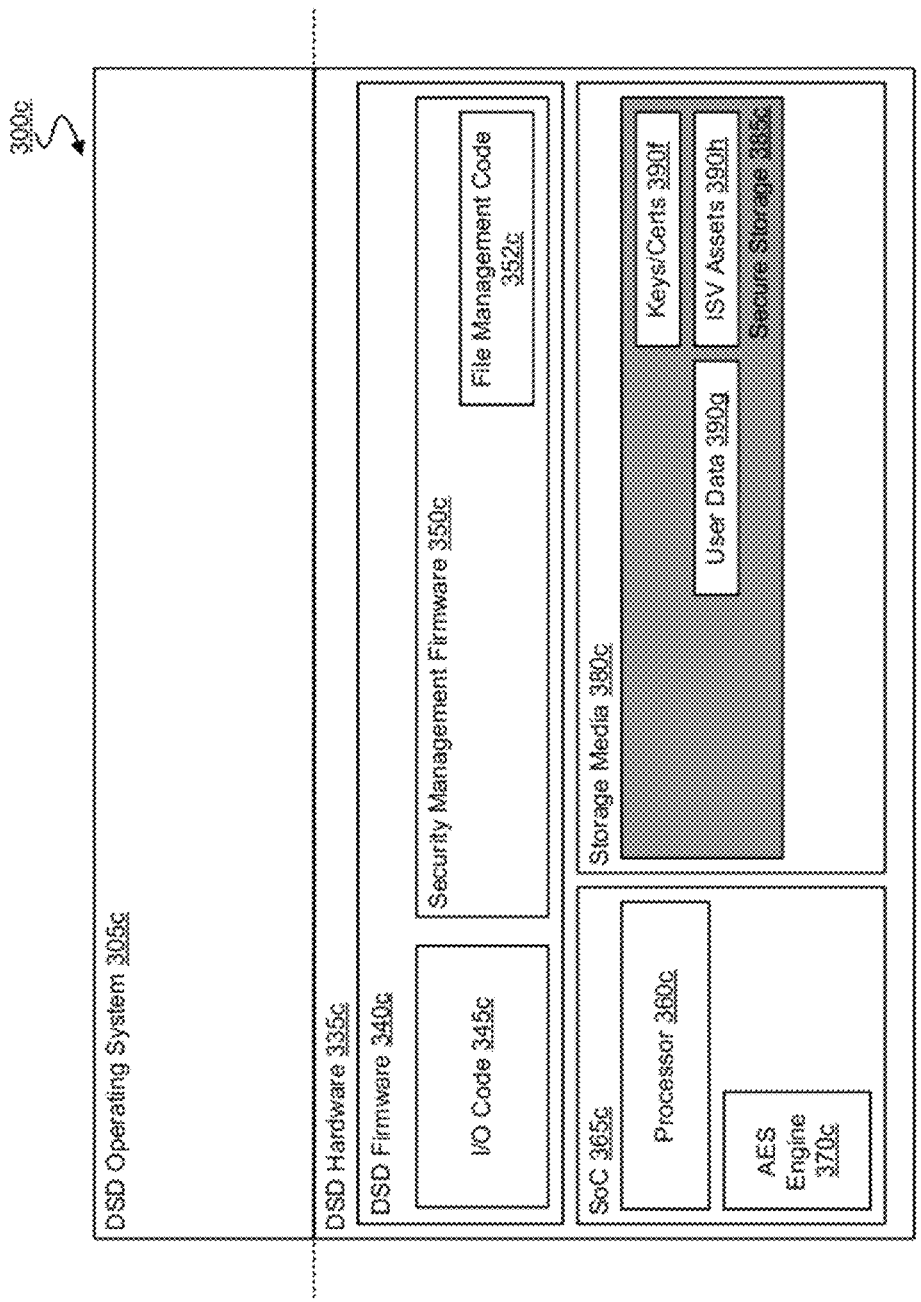

FIG. 3C illustrates select elements of a DSD 300c according to an embodiment. DSD 300c may include some or all of the features of DSD 300b, for example. More particularly, some or all of the features of DSD hardware 335c and/or DSD operating system 305c may be found, respectively, in DSD hardware 335b and/or DSD operating system 305b. For example, a processor 360c of DSD hardware 335c may execute DSD firmware 340c to implement an execution engine for I/O processes to access storage media 380c of DSD hardware 335c. In an embodiment, I/O processes may be implemented by an executing of I/O code 345c in DSD firmware 340c. Moreover, security management firmware 350c in DSD firmware 340c may implement one or more security management processes. In an embodiment, file management code 352c of security management firmware 350c may control access to secure storage 385c of storage media 380c.

In an embodiment, execution of file management code 352c may cause processor 360c to provision secure storage 385c for access by specified and approved agents (e.g. including applications, OS's, service providers such as AVS ISV, etc.). Access to secure storage 385c or other elements of DSD hardware 335c may be protected by any of a variety of encryption protocols—e.g. a protocol supported by an Advanced Encryption Standard (AES) encryption engine 370c which, for example, resides on a SoC 365c with processor 360c. Moreover, controlling access to secure storage 385c by remote agents may be a basis for improved service provisioning solutions. Access to secure storage 385c may include an agent exchanging user data 390g and/or Keys/Certs 390f information—e.g. for authentication and/or authorization.

By way of illustration and not limitation, portions of secure storage can 385c may provide secure "landing zones" for such agents—i.e. regions for agents to store privileged information such as passwords, certificates, software code, files used to deliver services (such as .DAT files used by ISVs), digital media (such as DRM entertainment content, HD movies, music, images, games, etc), as well as to securely execute code within a trusted (walled) environment. An example of such a landing zone is represented in ISV assets 390h.

In an embodiment, authorizing access to storage media 380c may be in response to DSD 300c participating in an exchange with a remote service coupled to host platform 150a—e.g. via a network. In an illustrative scenario, a user of host platform 150a may operate a web browser executing on host OS 152 to navigate to an e-commerce website—e.g. to purchase a product. User authentication information may be exchanged for the user to obtain access to a particular web service. In an embodiment, the web service may need to determine and/or update security capabilities of system 100a.

To support such an interaction between the user and a remote service, the remote service may store a software component in ISV assets 390c of secure storage 385c. Moreover, the remote service may store in ISV assets 390c and/or Keys/Certs 390f of secure storage 385c encryption keys or other information to secure message exchanges between DSD 300c and the remote service. Security management services of DSD operating system 305c, such as anti-malware software 310b, may clear the software component in ISV assets 390h for execution on processor 360c, e.g. according to techniques discussed herein. Once cleared, the software component may be invoked by the remote service for execution in DSD operating system 305c—e.g. to determine if DSD 300c has a given capability such as support for hardware based authentication.

By leveraging the trusted execution and storage environments in DSD 300c, the remote service may securely implement any of a variety of exchanges with, and/or operations in, DSD 100c to support the providing of services across a network. By way of illustration and not limitation, a remote service may invite the user of platform 150a to enroll in hardware-based authentication to be performed by the DSD 300c coupled thereto. Enrollment in such hardware-based authentication may allow the user to variously move DSD 110 to different platforms from which the user may access the e-commerce website. From one or all of these various platforms, the user may be authenticated to the remote service using tokens, keys and/or security software resident on DSD 300c. Even if the security state of a particular host platform coupled to DSD 300c is compromised, the security and integrity of the users' authentication information and/or authentication exchanges may nevertheless be trusted, due to the protections to secure storage 385c.

In an embodiment, DSD 300c may include capabilities to directly connect to a trusted entity (e.g. an ISV) via a network, bypassing the host OS. By way of illustration and not limitation, I/O code 345c may exchange network communications through a platform controller hub such as PCH 164, where the network communications are relayed to network interface 166 along a path which is independent of any general purpose host OS executing on host processing unit 160. Such network communications may be exchanged via any of a variety of wired and/or wireless network interfaces of host platform 150b.

Figure 3D:
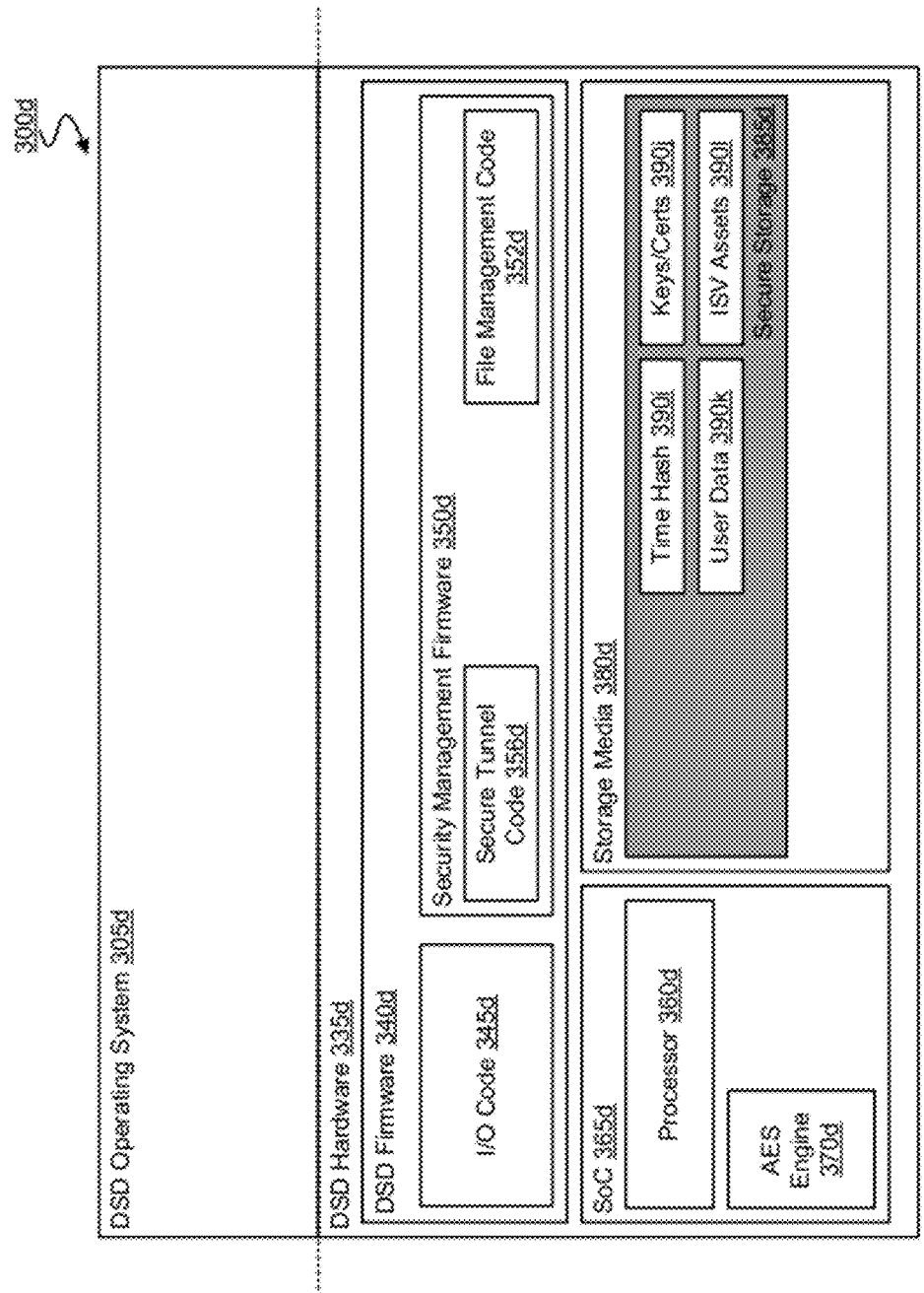

FIG. 3D illustrates select elements of a DSD 300d according to an embodiment. DSD 300d may include some or all of the features of DSD 300b, for example. More particularly, some or all of the features of DSD hardware 335d and/or DSD operating system 305d may be found, respectively, in DSD hardware 335b and/or DSD operating system 305b. For example, a processor 360d of DSD hardware 335d may execute DSD firmware 340d to implement DSD operating system 305d as an execution engine for I/O processes to access storage media 380d of DSD hardware 335d. In an embodiment, I/O processes may be implemented by an executing of I/O code 345d in DSD firmware 340d. Moreover, security management firmware 350d in DSD firmware 340d may implement one or more security management processes.

In an embodiment, file management code 352d of security management firmware 350d may control access to secure storage 385d of storage media 380d. Access to secure storage 385d or other elements of DSD hardware 335d may be protected encryption techniques supported by an AES (or other) engine 370d—e.g. where AES engine 370d resides on a SoC 365d with processor 360d. It is understood that AES engine 370d may reside on a separate integrated circuit chip than that of processor 360d, according to various embodiments.

Differential information may be used to reduce the frequency and/or scope of scans to be performed by security management processed of DSD 300d. In an embodiment, differential information such as that in time hash 390i may be used to identify regions of storage media 380d which have not been changed since some previous baseline scan of storage media 380d was performed. Moreover, one or more ISVs may provide—e.g. to ISV assets 390l in secure storage 385d—information, such as one or more .DAT files, including signatures or other information describing a set of known malware. Such access to secure storage 385c may include an ISV exchanging user data 390k and/or Keys/Certs 390j information—e.g. for authentication and/or authorization.

Using time hash 390i and ISV assets 390l, a security management process of processor 360d may identify particular files and/or regions of storage media 380d as (1) having changed (or not changed) since a baseline scan, and/or (2) having been scanned (or not been scanned) for at least some known malware. Based on such identifying, scanning of storage media 380d may be more efficiently tailored to minimize scan time and/or workload. By way of illustration and not limitation, a scan of storage media 380d may be avoided if no regions thereof have been changed and no new malware signatures have been provided by an AVS ISV. Alternatively, scanning of unchanged regions of storage media 380d may be selectively limited to scanning for only malware which has been newly identified malware, where such unchanged regions have already been scanned for previously identified malware. The availability of trusted differential information may reduce scanning workloads by orders of magnitude, depending on the data usage and the time allowed to transpire between AVS scans.

In an embodiment, processor 360d may execute secure tunnel code 356d for secure (e.g. out-of-band) communications between DSD 300d and a trusted entity external to system 100a. More particularly, secure tunnel code 356d may provide for the tunneling of data in communications between DSD 300d and the host platform to which DSD 300d is coupled. The tunneled data may be forwarded by, and yet inaccessible to, some or all operating systems (e.g host OS 152) executing on the host platform. It is understood that such tunneled data may be inaccessible insofar as the host OS is unaware of the existence of the tunneled data and/or the host OS cannot itself read or otherwise evaluate the tunneled data (e.g. due to encryption or other protections).

In an embodiment, DSD 300d may additionally or alternatively operate as a computing element for a high-performance computing (HPC) multi-node system. By way of illustration and not limitation, a cluster of computing platforms including one or more compute-capable storage devices such as storage device 300d may be networked to implement highly parallelizable HPC. Performance of such HPC networks may be enhanced by high-speed interconnect technology such as Optical-USB (Light-Peak) and/or the high I/O speed and native parallelism associated with NAND-based drives.

Integration of DSD 300d with other compute capable agents—as with operation in an HPC system—may be facilitated by extending an abstraction architecture such as the Intel® QuickAssist Technology Accelerator Abstraction Layer (AAL), the extending to allow workload distribution across the bus 156 and bus interface 120 coupling DSD 300d to host platform 150a.

This ability gives an agent residing on host platform 150a, or an agent remote from host platform 150a, to get at least part of a workload executed on DSD 300d—e.g. on accelerators contained inside the DSD 300d—or on other DSDs connected by variety of buses to the host platform 150a. Furthermore, because of the presence of the abstraction layer, the impact to the agent can be minimal or zero as future technologies variously move different accelerators to other areas on a host platform—e.g. a platform controller hub.

In various embodiments, HPC data exchanges to and/or from DSD 300d may be tunneled through the OS of the host platform 150a. However, it is understood that these HPC communications may not require such data tunneling, in various alternate embodiments. For example, DSD operating system 305d and a host operating system such as host OS 152 may operate as separate nodes of the same HPC system, in certain embodiments.

Figure 4:
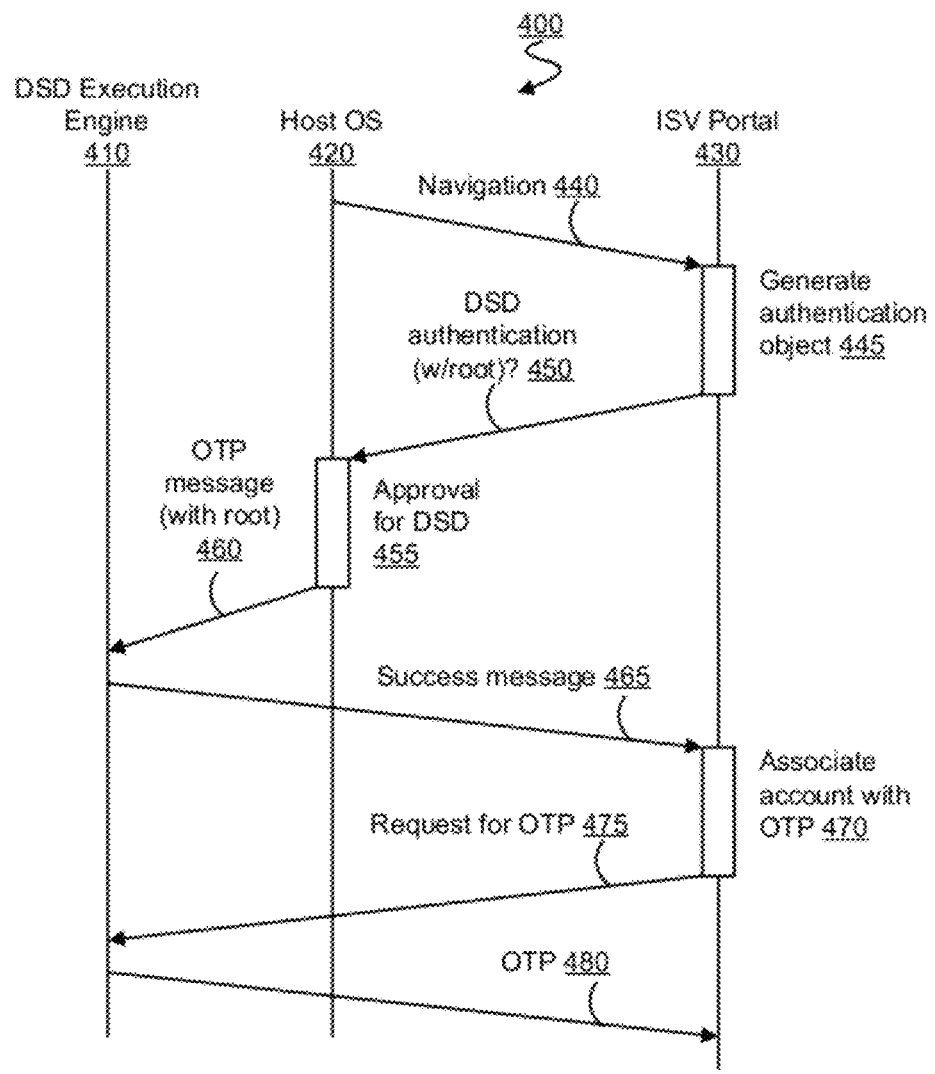
FIG. 4 is a swim-lane diagram illustrating select elements of an exchange according to an embodiment for secure service provisioning for a data storage device.

FIG. 4 illustrates select elements of an exchange 400 for secure service provisioning according to an embodiment. The exchange 400 includes various communications between a DSD execution engine 410 (e.g. the execution engine 130 of DSD 110), a host OS 420 of a host platform (such as host platform 150a) for the DSD, and an ISV portal 430 for an ISV which communicates with the host platform via a network. Operations of DSD execution engine 410 in exchange 400 may be in response to execution of security management code having some or all of the features of security management firmware 350a-d.

Method 400 includes, at 440, a user navigating in a network to access ISV portal 430—e.g. via a web browser of the host platform. The navigation 440 to access ISV portal 430 may include host OS 420 sending a communication such as a request for access to a service of ISV portal 430. In an embodiment, navigation 440 includes host OS 420 providing to ISV portal 430 authentication information, such as a user name and password, for a user of the host platform for DSD execution engine 410. In response to such communication, ISV portal 430 may, at 445, execute a JavaScript or other code to generate an authentication object for use in securing the provisioning of ISV services.

Alternatively or in addition, ISV portal 430 may, at 450, provide to host OS 420 a request 450 that local authentication be performed by the DSD which includes DSD execution engine 410—i.e. that authentication be performed at the DSD and separate from the host platform for host OS 420 to which the DSD is coupled. In an embodiment, the message 450 includes an authentication root—e.g. a random number generation seed to be used in synchronizing a token stored by ISV portal 430 with a token stored by DSD execution engine 410. The authentication root in message 450 may be signed and/or encrypted—e.g. based on a certificate provided by a manufacturer of the DSD on which DSD execution engine 410 resides.

The host OS 420 may, at 455, approve the requested authentication to be performed at the DSD. Approval 455 may, for example, be in response to a host platform user providing to host OS 420 input permitting such approval. Upon approval 455, host OS 420 may send to DSD execution engine 410 a one-time password (OTP) message 460 which includes the root from ISV portal 430. DSD execution engine 410 may verify the received OTP message 460—e.g. with key and/or certificate information stored in a secure storage of the DSD—to generate a one-time password for use in accessing services of ISV portal 430. Generation of the password may be based on the synchronizing of tokens which is made possible using the root in OTP message 460. Having verified OTP message 460, DSD execution engine 410 may send a success message 465 indicating such verification. In response to the success message 465, ISV portal 430 may, at 470, associate an account with the OTP for DSD execution engine 410, the associating to enable an access session for the DSD. ISV portal 430 may send to DSD execution engine 410 a request 475 for the one-time password which is based on the root, whereupon DSD execution engine 410 may provide the OTP to ISV portal 430, at 480, assuring secure provisioning of ISV services.

In an embodiment, generation, storing and/or communication of information for exchange 400 may be variously protected from a risk of compromised integrity of host OS 420. By way of illustration and not limitation, various communications—e.g. one or more of success message 465, request for OTP 475 and OTP 480—may be tunneled in a communication channel between DSD engine 410 and ISV portal 430. Such tunneling may isolate host OS 420 from certain access to detect or otherwise process information in such communications. Alternatively or in addition, tokens, keys, certificates, passwords or other security information may be stored in a region of secure DSD memory which is protected from access by host OS 420.

Figure 5:
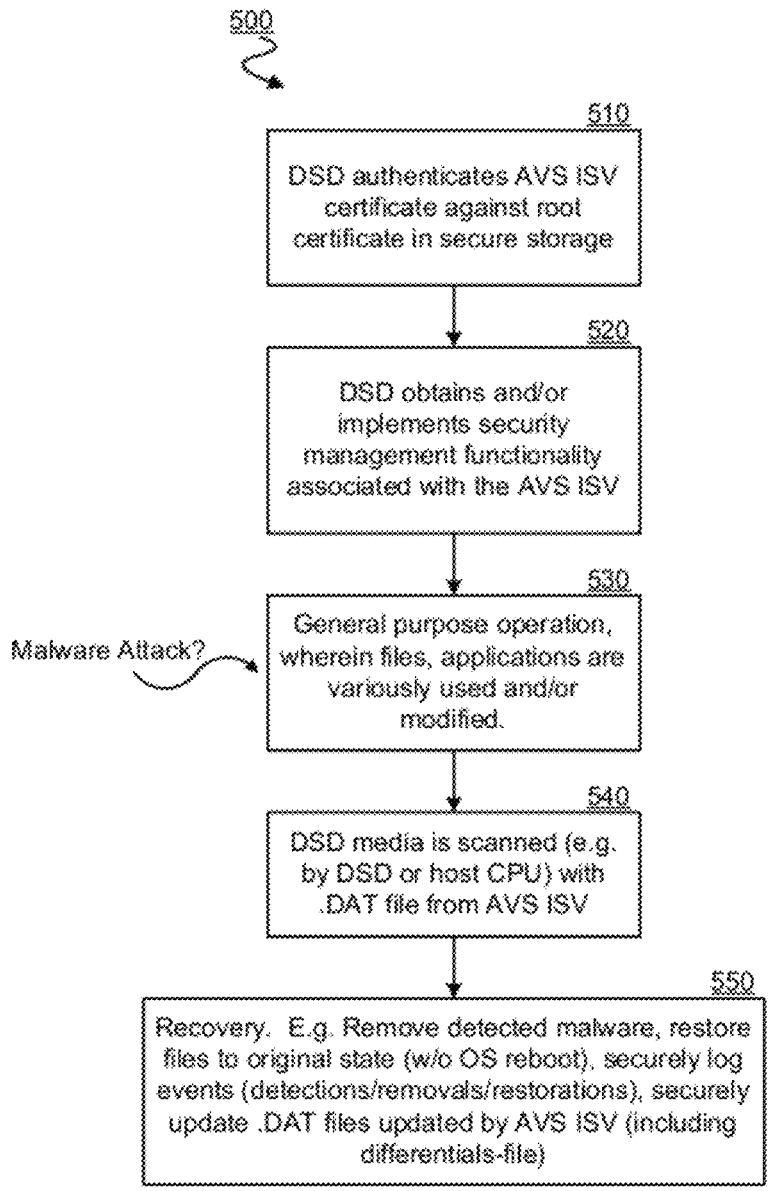
FIG. 5 is a flow diagram illustrating select elements of a method for implementing security management at a data storage device according to an embodiment.

FIG. 5 illustrates select elements of a method 500 for detecting and recovering from a malware attack at a DSD, according to an embodiment. Method 500 may be performed by an execution engine of a compute capable DSD, where the DSD is coupled to a host platform that is networked with a remote AVS ISV. Method 500 may include, at 510, the DSD authenticating the AVS ISV against a root certificate. In an embodiment, the root certificate is located in a secure storage of the DSD—e.g. secure storage 385a—and the authentication process executes inside the DSD, independent of the host CPU and chipset.

After the AVS ISV is authenticated, the DSD may, at 520, obtain and/or implement security management functionality associated with the AVS ISV. By way of illustration and not limitation, the DSD may provision any relevant security applications from the AVS ISV, allocate to the AVS ISV a specific locked range of secure storage 385a, and/or load any into the locked ranges any malware signatures provided by the AVS ISV.

After AVS ISV updates are obtained/implemented, DSD may perform general purpose (e.g. non-AVS) operations, at 530, wherein files and/or applications may be variously used and/or modified. In an embodiment, detection and/or recovery measures are implemented to protect such uses and/or modifications. Of concern is that the affects of a malware attack may take place during such general purpose operation. By way of illustration and not limitation, during such general purpose operations, changes to files and/or applications may be tracked, time-based hashes of the DSD's non-volatile storage media may be calculated, event logs may be maintained, and/or backup versions of data may be stored.

At 540, some portion of the DSD non-volatile media may be scanned to detect for any indication of a malware attack. Such scanning may be performed at least in part by the execution engine of the DSD. Alternatively or in addition, some or all of such scanning may be performed by the host OS of the host platform for the DSD. Scanning of the DSD non-volatile storage media may be based on malware signatures or other security information in a .DAT file or other data structure from the AVS ISV. In an embodiment, scanning may be performed by the DSD while the host platform for the DSD is in a low power mode (e.g. a standby or sleep mode).

In response to detecting any effects of malware, the DSD may implement recovery measures, at 550. For example, the DSD may remove any detected malware, restore modified data files to their original state, securely log malware detection events, and/or securely update AVS ISV files with differential or other information in aid of future operation of the AVS.

Techniques and architectures for providing security management are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

The invention claimed is:

1. A data storage device comprising:
a non-volatile storage media to store data;
an execution engine coupled to the non-volatile storage media, the execution engine comprising circuitry configured to execute a security management process to detect whether an access of the non-volatile storage media is authorized; and
a bus interface coupled to the execution engine, the bus interface to connect the data storage device to a bus of a host platform, wherein the data storage device is to operate as a peripheral of the host platform during execution of the security management process, wherein the execution engine further to execute an input/output (I/O) process for a message exchange between the execution engine and a storage driver of the host platform, wherein based on the message exchange, the execution engine further to access the non-volatile storage media on behalf of a host operating system executing with a host processor and a chipset of the host platform;
wherein the execution engine further to participate in communications, via the host processor and the chipset of the host platform, with a remote entity coupled to the host platform and the data storage device via a network, the communications including a first communication exchanged from the execution engine to the remote entity via the host platform, wherein the execution engine to encrypt the first communication to prevent an access to the first communication by the host operating system, wherein the execution engine further to restrict access by the host operating system of the host platform to a secure region of the non-volatile storage media, the secure region to store information received by the data storage device from the remote entity during the communications, wherein the execution engine to execute the security management process based on the information.

2. The data storage device of claim 1, wherein the security management process to identify an access authorization based on a security credential of an agent requesting access to the non-volatile storage media.

3. The data storage device of claim 2, wherein the security management process to identify the access authorization based on the security credential includes the security management process to verify an authentication code before committing a change to the data.

4. The data storage device of claim 1, wherein the security management process further to generate differential information to identify a change in the non-volatile storage media since a previous scan of the non-volatile storage media.

5. The data storage device of claim 1, the execution engine further to provide via the bus interface trusted information regarding the non-volatile storage media, wherein the trusted information is specific to one of a block of data, a sector of data, and a file, wherein the trusted information is provided to an application running on the host platform or to an agent external to the host platform.

6. The data storage device of claim 1, wherein the bus of the host platform includes one of a Universal Serial Bus (USB) bus, a Serial Advanced Technology Attachment (SATA) bus, a Peripheral Component Interconnect Express (PCI-E) bus and a Small Computer System Interface (SCSI) bus.

7. The data storage device of claim 1, the execution engine to establish a data tunnel to exchange messages via the host operating system with an agent external to the host platform or with a trusted agent of the host platform, the data tunnel to restrict access to the messages by the host operating system of the host platform.

8. The data storage device of claim 1, wherein the security management process to perform a scan of the non-volatile memory during a sleep mode of the host platform.

9. The data storage device of claim 1, further comprising a pattern matching accelerator to aid in the detection of specific patterns on the data stored on the non-volatile storage media.

10. A non-transitory computer readable storage medium having stored thereon instruction which, when executed by one or more processing units, cause an execution engine of a data storage device to perform a method comprising:
executing a security management process to detect whether an access of a non-volatile storage media of the data storage device is authorized, wherein a bus interface of the data storage device connects the data storage device to a bus of a host platform, wherein the data storage device operates as a peripheral of the host platform during execution of the security management process;

executing an input/output (I/O) process for a message exchange between the execution engine and a storage driver of the host platform via the bus interface, wherein based on the message exchange, the execution engine accesses the non-volatile storage media on behalf of a host operating system executing with a host processor and a chipset of the host platform;

participating in communications, via the host processor and the chipset of the host platform, with a remote entity coupled to the host platform and the data storage device via a network, including:

encrypting a first communication to prevent an access to the first communication by the host operating system; and sending the first communication from the execution engine to the remote entity via the host platform;

storing, to a secure region of the non-volatile storage media, information received by the data storage device from the remote entity during the communications, wherein the security management process is executed based on the information; and restricting access by the host operating system of the host platform to the secure region of the non-volatile storage media.

11. The non-transitory computer readable storage medium of claim 10, wherein the executing the security management process is further to identify an access authorization based on a security credential of an agent requesting access to the non-volatile storage media.

12. The non-transitory computer readable storage medium of claim 11, wherein the security management process generates differential information to identify a change in the non-volatile storage media since a previous scan of the non-volatile storage media.

13. The non-transitory computer readable storage medium of claim 10, wherein the security management process performs an integrity evaluation of data stored in the non-volatile storage media.

14. A data storage device comprising:

a non-volatile storage media to store data;

an execution engine coupled to the non-volatile storage media, the execution engine comprising circuitry configured to execute a security management process to detect whether an access of the non-volatile storage media is authorized, including the execution engine to perform, based on a security credential, an authentication of an agent external to the data storage device; and a bus interface coupled to the execution engine, the bus interface to connect the data storage device to a bus of a host platform, wherein the data storage device is to operate as a drive of the host platform during the authentication of the agent;

wherein the execution engine further to execute an input/output (I/O) process for a message exchange between the execution engine and a storage driver of the host platform, the message exchange for the execution engine further to access the non-volatile storage media on behalf of a host operating system executing with a host processor and a chipset of the host platform, wherein the authentication is transparent to the host operating system and to any security management engine of the host platform;

wherein the execution engine further to restrict access by the host operating system to a secure region of the non-volatile storage media, the secure region to store the security credential, the execution engine further to encrypt a first communication to prevent an access to the first communication by the host operating system, and to send the first communication from the execution engine via the host platform to a remote entity coupled to the host platform and the data storage device via a network.

15. The data storage device of claim 14, wherein the security management process to identify an access authorization based on the security credential, including the security management process to verify an authentication code before committing a change to the data.

16. The data storage device of claim 14, the security management process further to generate differential information to identify a change in the non-volatile storage media since a previous scan of the non-volatile storage media.

* * * * *